United States Patent

[11] 3,571,615

[72] Inventor James L. Kelly
Nashua, N.H.

[21] Appl. No. 834,685
[22] Filed June 19, 1969
[45] Patented Mar. 23, 1971
[73] Assignee Digital Equipment Corporation
Maynard, Mass.

[54] LOGIC CIRCUIT
10 Claims, 1 Drawing Fig.

[52] U.S. Cl. .......... 307/207,
307/215, 307/216, 235/176
[51] Int. Cl. .......... H03k 19/08,
G06t 5/04
[50] Field of Search .......... 307/207,
247; 328/95, 196; 235/176

[56] References Cited
UNITED STATES PATENTS
3,246,179 4/1966 Ballard .......... 307/307
3,296,426 1/1967 Ball .......... 235/176X

*Primary Examiner*—Donald D. Forrer
*Assistant Examiner*—B. P. Davis
*Attorney*—Cesari & McKenna

ABSTRACT: A logic circuit module includes a pair of input coincidence gates whose outputs are applied to a carry flip-flop. The outputs of the input coincidence gates are buffered together and applied to separate output coincidence gates together with the outputs of the carry flip-flop. The logic module performs serial binary addition by employing each pair of input bits for gating out as their sum either the bit in the carry flip-flop or its complement. Moreover, by supplying appropriate control inputs to the input gates and the carry flip-flop, the module is capable of executing a plurality of logic functions.

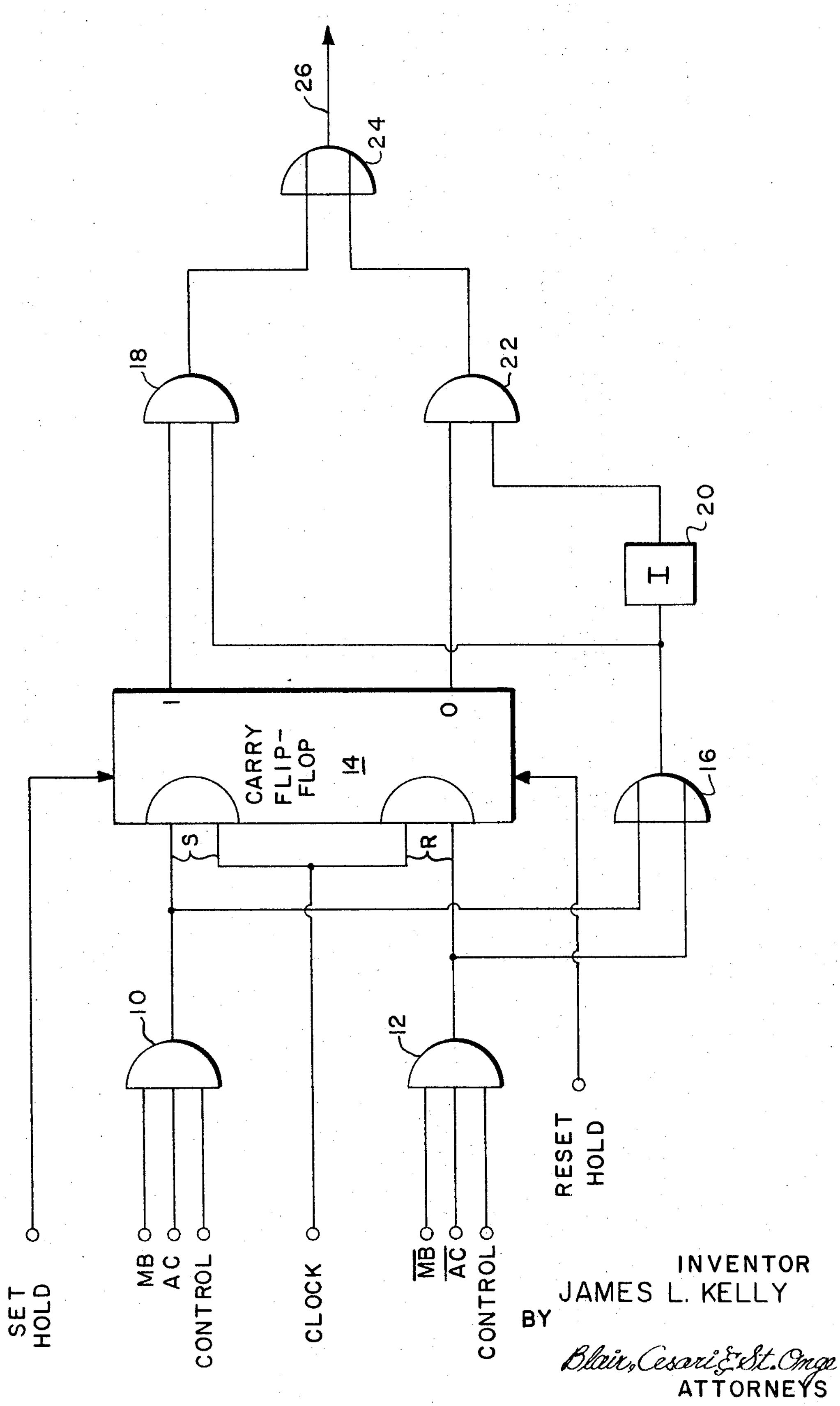
INVENTOR
JAMES L. KELLY
BY
Blair, Cesari & St. Onge
ATTORNEYS

LOGIC CIRCUIT

BACKGROUND OF THE INVENTION

Data processing systems, including digital computers, utilize a wide variety of logic circuit elements for performing various arithmetic and logic manipulations of the data handled by the system. Thus there are binary adders, AND gates, NAND gates, OR gates, NOR gates, etc. Typically, each of these logic elements is designed exclusively for the particular logic function it is to perform and none other. Thus, data processing systems are made up of a variety of logic elements of different circuit design.

In general purpose data processing systems, such as general purpose digital computers, a particular program will require the use of only a small number of the logic elements included in the system. Thus for a particular system operation, there are a number of logic elements which stand idle; having no function in the particular operation being run.

SUMMARY OF THE INVENTION

According to the present invention, there is provided a universal logic circuit module which, by virtue of its design, is capable of functioning not only as a serial binary adder, but also of performing all Boolean operations. Yet, the logic module of my invention is of less design than serial binary adders in wide use today.

The logic circuit module includes input gating means connected to receive binary inputs. The input gating means is selectively preconditioned in accordance with the function to be performed on the binary inputs. A bistable circuit is connected to the input gating means and is either selectively conditioned by the binary inputs or by a separate control input, again depending on the function to be performed. The input gating means is also connected to output gating means together with the outputs of the bistable circuit. The output of the output gating means constitutes the logic circuit module output.

More specifically, the input gating means comprises a pair of input coincidence gates; one receiving pairs of bits in succession and the other receiving the complements thereof. The outputs of these gates are respectively connected to the set and reset inputs of the bistable circuit, a conventional flip-flop. Also, the outputs of these gates are buffered together to provide a single output which is supplied together with its complement to separate output coincidence gates included in the output gating means. The set output of the flip-flop is applied to one output coincidence gate while the reset output is applied to the other. The separate outputs of the output coincidence gates are buffered together to provide the module output.

As a serial binary adder, the module operates on the heretofore unobserved phenomenon of binary addition that when a pair of input bits to be added are equal, their sum corresponds to the bit entered into a carry register as the result of the previous bit addition. On the other hand, if the input bits are unequal, their sum corresponds to the complement of the bit contained in the carry register. Thus, the flip-flop, serving as a carry register, is initially reset to a binary zero and is set to enter a binary one each time the input bits are both ones and reset to enter a binary zero each time the input bits are both binary zeros. Otherwise the content of the carry flip-flop is left unchanged. An entry, if called for, of a binary one or binary zero into the carry flip-flop is timed by a clock pulse to occur at the conclusion of each bit addition. Under these circumstances, each pair of bit inputs is merely sampled to determine whether they are equal or unequal, and used to control the output gating means according to pass to the module output either the bit content of the carry flip-flop or the complement thereof.

The logic module of my invention is also capable of performing an AND function merely by disabling the input coincidence gate receiving the complements of the two binary inputs and holding the carry flip-flop in its set or binary 1 state. To carry out a NAND function, which is actually the inversion of an AND function, the carry flip-flop is held in its reset or binary zero state.

For an OR function, the carry flip-flop is held in its reset state, and the input coincidence gate receiving the binary inputs is disabled, leaving the input coincidence gate receiving the complements of the binary inputs enabled. The NOR function, which is merely the inversion of the OR function, is accomplished by merely holding the carry flip-flop in its set state.

By appropriate conditioning, the module of my invention is also capable of performing an exclusive OR (XOR) function. An XOR function, as the name implies, detects when the binary inputs are of opposite logical significance. Thus, if the binary inputs are a 1 and a 0, an XOR gate provides a binary 1 output. If the binary inputs are equal, the gate output is a binary 0. An XOR gate is provided merely by holding the carry flip-flop in its reset or 0 state.

The complement of an exclusive OR function is an equivalent (EQU) function. Thus, when the binary input are either both zeros or both ones, the output of an EQU gate is a one. If the binary inputs are unequal, the gate output is a 0. To perform this function with the logic circuit module of my invention, the carry flip-flop is merely held in its set state.

In addition, the logic circuit module can be controlled such as to function as an inverter, thus performing a NOT function. In this case, the carry flip-flop is held in its reset state, and one of the input coincidence gates is disqualified while one of the inputs to the other input coincidence gate is held at an enabling level. When a series of bits is supplied to the other input of the enabled input gate, they become complemented or inverted at the output of the module. The module may also be conditioned to perform a "set to zero" function by disqualifying both input coincidence gates and holding the carry flip-flop in its set state. Under these conditions, the module output is always a binary 0. Conversely a "set to one" function may be carried out by disqualifying the input gates and holding the carry flip-flop in its reset or 0 state, then the only possible output from the module is a binary 0.

The invention accordingly comprises the features of construction, combination of elements, and arrangements of parts which will be exemplified in the construction hereinafter set forth, and the scope of the invention will be indicated in the claims.

For a fuller understanding of the nature of the invention, reference should be had to the following detailed description taken in connection with the accompanying drawing, in which the sole FIGURE is a detail block circuit diagram of an embodiment of my invention.

DETAILED DESCRIPTION OF THE INVENTION

Referring now to the drawing, the universal logic circuit module of my invention includes a pair of input AND gates 10 and 12. Gate 10 receives a pair of binary inputs designated MB and AC. Input MB may be taken from the set output of the last stage of a shiftable memory buffer register, while input AC may be taken from the set output of the last stage of a shiftable accumulator register. A memory buffer register and an accumulator register are typical registers found in general purpose digital computers. However, it will be appreciated that these inputs may originate from any binary sources. The third input to AND gate 10 is a control input which is a binary one if the gate 10 is to be qualified or enabled or a binary zero when the gate is to be disqualified or disabled. Two inputs to AND gate 12 are constituted by the complements or inversions of the MB and AC inputs to gate 10, i.e. $\overline{MB}$ and $\overline{AC}$. These inputs may be derived from the same source as inputs MB and AC through an inverter. Alternatively, inputs $\overline{MB}$ and $\overline{AC}$ may be taken from the reset outputs of the last stages of the memory buffer and accumulator shift registers. The third input to AND gate 12 is a control p input which is held at a binary one to qualify gate 12 or a binary 0 to disqualify it.

The output of AND gate 10 is supplied to the gated set input of a carry flip-flop 14, while the output of AND gate 12 is supplied to the gated reset input thereof. The carry flip-flop 14 is shifted from one of its stable states to the other to enter a binary 1 or binary 0 by clock pulses supplied as the second input to each of its gated set and reset inputs. The clock pulses control the times during a serial binary addition operation when the state of the carry flip-flop is changed. For the various logical functions to be described, clock pulses are not required.

The carry flip-flop 14 receives two additional inputs. One is a set hold input which is a control input serving to hold the carry flip-flop in its set or binary 1 state. Conversely, a reset hold input serves as a control input to hold the carry flip-flop 14 in its reset or binary 0 state.

The outputs of AND gates 10 and 12 are buffered together in an OR gate 16. The output of this OR gate is supplied directly to one input of an output AND gate 18 and through an inverter 20 to one input of a second output AND gate 22. The second input of AND gate 18 is taken from the set output of the carry flip-flop 14, while the second input to AND gate 22 is taken from the carry flip-flop reset output. The separate outputs of AND gates 18 and 22 are buffered together in an OR gate 24, whose output on line 26 constitutes the logic circuit module output.

First considering the operation of the universal logic circuit module of my invention as a serial binary adder, the control inputs to AND gates 10 and 12 are held at binary 1 levels so as to enable them to respond to the binary inputs MB, AC, MB and AC. The set hold and reset hold control inputs are held at levels permitting carry flip-flop 14 to respond to incoming clock pulses when its gated inputs are enabled by the outputs of AND gates 10 and 12.

It is seen that when the inputs MB and AC to AND gate 10 are both binary 1's, its output is a binary 1, which is effective to qualify the gated set input of carry flip-flop 14. On the next clock pulse, flip-flop 14 is triggered to its set state, effecting the entry of a binary 1 therein. Conversely, if binary inputs MB and AC are 0's, then their complements $\overline{MB}$ and $\overline{AC}$ are binary 1's, thus enabling AND gate 12 to qualify the gated reset input of flip-flop 14. The flip-flop is thus reset to enter a binary 0 therein on the next occurring clock pulse. Under these circumstances, flip-flop 14 serves as a carry register.

In adding two binary numbers serially, the module takes advantage of the phenomenon that when the two bit inputs are equal, i.e., both 0's or both 1's, their sum corresponds to the bit entered or retained in the carry register (flip-flop 14) as the result of the previous bit addition. On the other hand, if the binary inputs are unequal, i.e., one a binary 1 and the other a binary 0, their sum corresponds to the complement of the bit entered or retained in flip-flop 14 as the result of the previous bit addition.

By way of example, assume that we wish to add a binary 9(1001) and a binary 5(0101). Initially, the carry flip-flop is in its reset or binary 0 state. The least significant bits of these numbers, both binary 1's, are applied as the MB and AC inputs to gate 10 and their complements, both binary o's, are applied as the inputs $\overline{MB}$ and $\overline{AC}$ to gate 12. The output of AND gate 10 is a binary 1, while the output of AND gate 12 is a binary 0. Under these circumstances, the output of OR gate 16 is a one which qualifies AND gate 18 but, through inverter 20, disqualifies AND gate 22. Since flip-flop 14 contains a binary 0, its set output is a 0. Consequently the outputs of gates 18 and 22 are both o's. The output on line 26 is a binary 0, the sum of two binary 1's. It will be noted that the binary 0 sum corresponds to the bit contained in flip-flop 14 and the binary inputs were equal. After the sum output on line 26 issues, a clock pulse is supplied to the gated set and reset inputs of flip-flop 14. Since the output of AND gate 10 is a 1, the gated set input of the carry flip-flop is enabled and the clock pulse causes the flip-flop to be set, entering a binary 1 therein. The output of AND gate 12 is a binary 0, and therefore the gated reset input is disabled.

The second least significant bits of a binary 9 and a binary 5 are both binary 0's . When these bits are supplied to the inputs of AND gates 10 and 12, the output of the former is a binary 0, while the latter provides a binary 1 output. The output OR gate 16 is a one which qualifies gate 18, but disqualifies gate 22 through inverter 20. Since the carry flip-flop contains a binary 1, AND gate 18 is enabled to supply a binary 1 on output line 26. A binary 1 is the appropriate sum of two binary 0's where there has been a carry from the previous bit addition. Here again, the binary inputs were equal and their sum corresponds to the bit contained in flip-flop 14.

After the binary 1 on output line 26 has issued, a clock pulse resets flip-flop 14 to its binary 0 state since the output of AND gate 12 is a 1, while the output of AND gate 10 is a 0.

The second most significant bits of the number in question are a binary 0 and a binary 1. The outputs of AND gates 10 and 12 are both binary 0's, as is the output of OR gate 16. AND gate 18 is disqualified while AND gate 22, by virtue of inverter 20, is qualified. Since the carry flip-flop contains a binary 0, AND gate 22 is fully qualified to provide a binary 1 on output line 26. In this case, the binary inputs were unequal and their sum corresponds to the complement of the bit in the carry flip-flop. Since the outputs of AND gates 10 and 12 are both binary 0's, both the gates set and gated reset inputs of flip-flop 14 are disabled, and the flip-flop content cannot be altered by the next occurring clock pulse.

Finally, the next binary inputs, the most significant bits of the numbers 9 and 5, are a binary 1 and a binary 0. Consequently, the outputs of AND gates 10 and 12 are binary 0's as is the output of OR gate 16. AND gate 18 is disqualified while AND gate 22 is qualified by the binary 0 in flip-flop 14 to pass a binary 1 out onto line 26. Here again, the binary inputs are unequal, and thus the complement of the bit held in the carry flip-flop is gated out on line 26. Thus, the sum of binary 9 and binary 5 provided by the module is appropriately 14(1110).

In addition to functioning as a serial binary adder, the logic circuit module of my invention can also function as an AND gate. In this mode, a binary 0 level is applied to the control input of AND gate 12 to disable it. The set hold input to carry flip-flop 14 receives a control input level forcing the carry flip-flop to its set or binary 1 state where it is held. The control input to AND gate 10 is held at a binary 1 level to maintain it qualified. As a result, if the MB and AC inputs to AND gate 10 are both binary 1's, its output is a binary 1. This binary one passes through OR gate 16 and is applied as one input to AND gate 18. Since the carry flip-flop is in its 1 state, AND gate 18 is qualified to pass a binary 1 through the output OR gate 24 to line 26.

On the other hand, if one or both of the inputs to AND gate 10 is a binary 0, its output is a 0, and thus so is the output of OR gate as 16. AND gate 18 is disqualified while AND gate 22 through inverter 20, is qualified. However, the carry flip-flop is in its set state, and consequently the output of AND gate 22 is a binary 0. The output of OR gate 24 is therefore a binary 0.

With AND gate 10 enabled and AND gate 12 disabled, and a control signal applied to the reset hold input of carry flip-flop 14 forcing to its 0 state, the module functions as an inverted AND gate, or a NAND gate. For a NAND function, the output is a binary 0 when the two inputs are binary 1's. For all other input conditions, a NAND gate output is a binary 1. It is seen that, with the carry flip-flop in its 0 state, if the MB and AC inputs to AND gate 10 are binary 1's, its output is a binary 1 as is the output of OR gate 16. AND gate 18 is qualified, but its output remains a binary 0, since the carry flip-flop is in its 0 state. By virtue of inverter 20, AND gate 22 is disqualified, and therefore the output on line 26 is a binary 0.

If one or both of the inputs to AND gate 10 are binary 0's, its output is a 0. The resulting binary 0 output of OR gate 16 disqualifies AND gate 18, but, through inverter 20, qualifies AND gate 22. Since the carry flip-flop 14 is in its 0 state, AND gate 22 passes a binary 1 out through OR gate 24 onto line 26.

To accomplish an OR function, the control input to AND gate 10 is held at a binary 0 level to disqualify it. On the other hand, AND gate 12 is qualified by supplying a binary 1 level to its control input. A control signal is also applied to the reset hold input of carry flip-flop 14, maintaining it in its binary 0 state. Under these conditions, the output of gate 12 is normally a binary 0 which is passed through OR gate 16 and inverted in inverter 20 to qualify AND gate 22. Since the carry flip-flop is in its 0 state, AND gate 22 is enabled to pass a binary 1 through OR gate 24 to the output line 26. Thus, the output of the logic module is a binary 1 even in the absence of inputs $\overline{MB}$ and $\overline{AC}$. However, whenever the two inputs to AND gate 12 are binary 0's, actually binary 1's due to inversion, AND gate 12 is enabled and its output goes to a binary 1. This binary 1 passes through OR gate 16 to qualify AND gate 18. However, the carry flip-flop is in its 0 state, and thus the output of AND gate 18 is a binary 0. AND gate 22 is also disqualified since its input, derived from OR gate 16, is inverted from a binary 1 to a binary 0 by inverted 20. Thus, when AND gate 12 receives two binary 0 inputs, the output on line 26 goes to a binary 0. When one or both of the inputs to AND gate 12 is a binary 1 before inversion to a binary 0, the output of AND gate 12 is a binary 0 as is the output of OR gate 16. Inverter 20 inverts this binary 0 as is the output of OR gate 16. Inverter 20 inverts this binary 0 to a binary 1, qualifying AND gate 22, and, with carry flip-flop 14 in its 0 state, a binary 1 is passed through OR gate 24 to line 26.

To accomplish a NOR function, which is an inverted OR function, the carry flip-flop is held in its binary 1 state rather than its binary 0 state. Gate 12 is qualified so as to respond to the inversion of the binary signals to be processed according to the NOR function. It is seen that when the inputs to AND gate 12 are binary 0's before inversion, its output is a binary 1 which, through OR gate 16, qualifies AND gate 18. Carry flip-flop 14, being in its 1 state, enables AND gate 18 to pass a binary 1 through OR gate 24 onto output line 26. On the other hand, if one or both of the inputs to AND gate 12, before inversion, are binary 1's, its output is a binary 0. This disqualifies AND gate 18, but, through inverter 20, qualifies AND gate 22. However, the carry flip-flop is in its 1 state and, therefore the output on line 26 is a binary 0. This satisfies the requirements of a NOR function.

An exclusive OR (XOR) function may be accomplished by holding the carry flip-flop 14 in its 0 state and by supplying binary 1's to the control inputs of AND gates 10 and 12, such that they both are enabled. According to an XOR function, if one or the other but not both of the binary inputs is a binary 1, the output is a binary 1. If the binary inputs are both 0's or both 1's, the output must be a 0. Looking at the block diagram, it is seen that if the inputs are equal, either both 0's or both 1's, one or the other of AND gates 10 and 12 will provided a binary 1 output, which through OR gate 16 qualifies AND gate 18. However, the carry flip-flop 14 is in its 0 state, and therefore the output of OR gate 24 is a binary 0. On the other hand, if one of the inputs is a binary 1 and the other a binary 0, the outputs of AND gates 10 and 12 are both binary 0's. As a consequence, AND gate 18 is disabled and AND gate 22 is enabled. Since the carry flip-flop is in its 0 state, the output of AND gate 22 is a binary 1 which is passed through OR gate 24 to the output line 26.

An equivalence (EQU) function, which is an inverted XOR function, is accomplished by holding the carry flip-flop 14 in its 1 state. For and EQU function, the output should be a binary 1 when the inputs are either both binary 0's or both binary 1's. If one input is a binary 1 and the other a binary 0, the output should be a 0. From the drawing, it is seen that when the two inputs are either both 0's or 1's, one or the other of AND gates 10 and 12 is a binary 1 which is effective to qualify AND gate 18, but through inverter 20 to disqualify AND gate 22. Since the carry flip-flop is in its 1 state, the output of AND gate 18 is a binary 1 which passes through OR gate 24 to output line 26. If however, the two inputs are unequal, in that one is a binary 1 and the other a binary 0, the outputs of both gates 10 and 12 are 0's. This disables gate 18 and enables gate 22. However, carry flip-flop is in its 1 state, and thus the output of AND gate 22 is a binary 0, which appears on output line 26 as a binary 0. This satisfies the requirements of an EQU function.

A NOT logical function merely calls for the inversion of a series of input bits. To accomplish this function, carry flip-flop is held in its 0 state, and gate 12 is disabled. Since a NOT function is only concerned with a single series of binary bits, two of the three inputs to AND gate 10 are held at binary 1 levels to qualify it. The third input, for example input MB, receives the bits to be inverted. It is seen that a binary 1 supplied to the MB input of AND gate 10 results in a binary 1 output which enables AND gate 18 and disables AND gate 22. However, the carry flip-flop is in its 0 state, and thus the output on line 26 is a 0, the complement of the input bit. Conversely, if the input bit is a binary 0, the output of AND gate 10 is a 0 which disqualifies AND gate 18, but qualifies AND gate 22. Since the carry flip-flop is in its 0 state, AND gate 22 passes a binary 1 out on to line 26.

If it is desired to perform a set to 0 logical function, the control inputs to AND gates 10 and 12 are held at binary 0's to disqualify them. The carry flip-flop 14 is held in its one state. Under these conditions, it is seen that the output of AND gates 10 and 12 are both 0's, which through OR gate 16 disables AND gate 18 and, through OR gate 16 and inverter 20, enables AND gate 22. However, since the carry flip-flop is in the 1 state, the outputs of AND gates 18 and 22 are both binary 0's, as is the output of OR gate 24 on line 26. As a consequence, regardless of the inputs to AND gates 10 and 12, the output is always a binary 0.

By the same token, the logic circuit module can be used to accomplish a set to one logic function. Here again, both gates 10 and 12 are disqualified, and the carry flip-flop is held in a 0 state. It is seen that the outputs of AND gates 10 and 12 are both binary 0's which disables AND gate 18, but, through inverter 20, enables AND gate 22. Since the content of the carry flip-flop is a binary 0, AND gate 22 is enabled and its output a binary 1, is passed through OR gate 24 on to line 26. Thus, regardless of the inputs supplied to AND gates 10 and 12, the output on line 26 is always a binary 1.

It will be appreciated that while the input and output coincidence gates are shown as AND gates, inverted logic elements may be employed. That is, the AND gates may be replaced by coincidence NAND gates. In this case, the buffer, OR gate 24 may remain or be replaced by a NOR gate and an inverter. The gated inputs to carry flip-flop 14 would be wired so as to be enabled by binary 0's.

While the disclosed embodiment is adapted to serial binary addition, it will be appreciated that the teachings of my invention may be applied to parallel binary addition.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

I claim:

1. A logic circuit comprising, in combination:

A. first and second input coincidence gates, at least one receiving the binary inputs to be processed;

B. a flip-flop;

1. the output of said first input coincidence gate connected to the set input of said flip-flop, and
  2. the output of said second input coincidence gate connected to the reset input of said flip-flop;

C. a first buffer gate connected to receive the outputs of said first and second input coincidence gates;

D. first and second output coincidence gates, 1. said first output coincidence gate connected to receive the output of said first buffer gate and the output of said flip-flop; and 2. said second output coincidence gate connected to receive the complements of said first buffer gate output and said flip-flop output; and E. a second buffer gate connected to receive the outputs of said output coincidence gates, 1. the output of said second buffer gate constituting the overall output of said circuit.

2. The logic circuit defined in claim 1 adapted as a binary adder, wherein:

1. a pair of bits to be added are applied to said first input coincidence gate,
2. the complements of said bits are applied to said second input coincidence gate,
3. said input bits operating through said first buffer gate to control said output coincidence gates to pass through to the output of said second buffer gate as the bit sum the bit contained in said flip-flop when said input bits are equal and the complement of the bit in said flip-flop when said input bits are unequal, and
4. said flip-flop serves as a carry register,
   a. said set input thereof enabled by said first input coincidence gate when said bits are both binary 1's for the entry of a binary 1 therein, and
   b. said reset input thereof enabled by said second input coincidence gate when said bits are both binary o's for the entry of a binary 0 therein,
5. the entry of a bit in said flip-flop being timed to occur after the bit sum has been sensed at the output of said second buffer gate.

3. The logic circuit defined in claim 1, wherein a pair of binary inputs is applied to only one of said input coincidence gates, and (1) said flip-flop adapted to be held in one or the other of its stable states such that said circuit selectively performs AND and NAND functions on said binary inputs.

4. The logic circuit defined in claim 1, wherein the complements of a pair of binary inputs are applied to only one of said input coincidence gates, and (1) said flip-flop adapted to be held in one or the other of its stable states such that said circuit selectively performs OR and NOR functions on said binary inputs.

5. The logic circuit defined in claim 1, wherein a pair of binary inputs are applied to one of said input coincidence gates and their complements to the other of said input coincidence gates, and (1) said flip-flop adapted to be held in one or the other of its stable states such that said circuit selectively performs EXCLUSIVE OR and EQUIVALANCE functions on said binary inputs.

6. The logic circuit defined in claim 1, wherein 1. said flip-flop adapted to be held in one or the other of its stable states, and
2. said input coincidence gates individually adapted to be selectively disabled,
3. whereby said circuit is adapted to selectively perform NOT, "set to zero" and "set to one" logic functions on binary inputs thereto.

7. A universal logic circuit comprising, in combination:

A. first and second input coincidence gates, at least one receiving the binary inputs to be processed,
   1. said input coincidence gates individually adapted to be selectively disabled;

B. a flip-flop having
   1. a gated set input connected to receive the output of said first input coincidence gate and clock pulses, and
   2. a gated reset input connected to receive the output of said second input coincidence gate and said clock pulses, and
   3. said flip-flop selectively adapted to be held in one or the other of its stable states and thus nonresponsive to its gated inputs;

C. a first buffer gate connected to receive the outputs of said first and second input coincidence gates;

D. first and second output coincidence gates,
   1. said first output coincidence gate connected to receive the output of said first buffer gate and the set output of said flip-flop; and
   2. said second output coincidence gate connected to receive the complements of said first buffer gate output and said flip-flop set output; and E. a second buffer gate connected to receive the outputs of said output coincidence gates,
   1. the output of said second buffer gate constituting the overall output of said circuit;

F. whereby said input coincidence gates and said flip-flop are selectively adapted such that said circuit can perform any one of the following functions:
   1. serial binary addition,
   2. AND,
   3. NAND,
   4. OR,
   5. NOR,
   6. EXCLUSIVE OR,
   7. EQUIVALENCE,
   8. NOT,
   9. SET TO ZERO, and
   10. SET TO ONE.

8. A binary adder comprising, in combination:

A. input gating means receiving the input bits and their complements of the numbers to be added;

B. a carry register connected to said input gating means,
   1. said carry register further connected to receive clock pulses for entering, at the conclusion of each bit addition, a binary 1 in said carry register each time the bits to be added are both binary 1's and a binary 0 therein each time the bits to be added are binary 0's,
   2. said carry register containing a binary 0 preparatory to the addition of the binary numbers; and C. output gating means connected to the carry register and said input gating means for gating out, as the sum of each bit addition, the bit in said carry register when the input bits are equal and the complement of the bit in said carry register when the input bits are unequal.

9. The binary adder defined in claim 8, which functions in serial fashion, and wherein 1. said input gating means includes
   a. a first coincidence gate for receiving successive bits of the number to be added, the output being connected to a gated binary 1 input of the carry register which also receives said clock pulses,
   b. a second coincidence gate for receiving the complements of the bits received by said first coincidence gate, the output of said second coincidence gate connected to the binary 0 input of said carry register which also receives said clock pulses, and
   c. a buffer connected to the outputs of said first and second coincidence gates and having an output connected to said output gating means.

10. The binary adder defined in claim 9, wherein 1. said output gating means includes
   a. a first output coincidence gate having one input connected to receive a binary 1 output from said carry register and another input connected to the output of said input gating means buffer,
   b. a second output coincidence gate having one input connected to receive a binary 0 output from said carry register and another input connected to receive the inverted output of said input gating means buffer, and
   c. an output buffer connected to the outputs of said first and second output coincidence gates.